Jan. 11, 1966 S. FELDMAN 3,229,230

SUPPRESSED CARRIER MODULATOR

Filed Oct. 19, 1962

INVENTOR.

Stanley Feldman

BY

Mueller + Aichele

Attys.

United States Patent Office
3,229,230
Patented Jan. 11, 1966

3,229,230
SUPPRESSED CARRIER MODULATOR

Stanley Feldman, Evanston, Ill., assignor to Motorola, Inc., Chicago, Ill., a corporation of Illinois
Filed Oct. 19, 1962, Ser. No. 231,749
1 Claim. (Cl. 332—44)

This invention relates to signal modulation systems and more particularly to the generation of suppressed carrier double sideband signals.

In many applications utilizing suppressed carrier modulation it is particularly important to keep carrier suppression as low as possible while at the same time providing linear envelope modulation and resultant signal which is drift free over long periods of operation. Problems such as linearity and drift become particularly vexing when the modulating signal frequency is in the same order of magnitude as the carrier signal frequency and under such conditions the provision of a stable circuit which will insure a high degree of carrier rejection and at the same time produce adequate separation of desired and undesired modulation products become correspondingly more difficult as the carrier and the modulating signal become closer in frequency. Such problems arise, for example, in stereophonic FM multiplex signal generating systems, where typically the carrier may be 38 kilocycles while the modulating signal may vary from a few hundred cycles per second to 15 kilocycles or more. Since stringent stereophonic multiplexing specifications require that crosstalk be kept at a minimum, it is particularly important in such systems that distortion and drift be kept at a minimum while carrier rejection is retained at a maximum.

Known bridge-type modulators using matched diodes or balanced windings on a transformer require careful component selection to provide maximum cancellation of undesired frequency components and modulation products. Where transformers are used, phase shifts introduced as the modulation frequency signal varies over a wide range tends to cause further distortion and drift and makes channel separation by conventional filtering means more difficult.

It is therefore an object of the present invention to provide a highly stable, linear suppressed carrier signal generator.

Another object is to provide an improved method for generating suppressed carrier double sideband signals, which method results in a high degree of carrier suppression and a minimum of signal distortion.

A further object of the invention is the provision of a method and system for generating suppressed carrier double sideband signals particularly adapted for applications where the modulating signal is of the same order of frequency as the carrier.

Still another object of the invention is the provision of a suppressed carrier modulating system which may be readily transistorized and does not require the use of accurately matched circuit components in order to achieve stable operation with a high degree of carrier suppression and low signal distortion.

A feature of the invention is the provision of a modulating system having means to produce two square waves which are at carrier frequency and 180° out-of-phase with one another, means for applying 180° out-of-phase modulation signals to such square waves, and means for combining and filtering the resultant modulated square waves to thereby provide a suppressed carrier double sideband signal.

Another feature is the provision of a method for generating suppressed carrier signals by producing two 180° out-of-phase square waves at carrier frequency, modulating the square waves with information signals which are correspondingly 180° out-of-phase, adding the resultant modulated square waves and filtering unwanted frequency components from the sum of the two modulated square wave signals.

A further feature of the invention is the provision of a switching circuit for providing two square waves at carrier frequency and having a 180° phase relationship with one another, means to modulate each square wave with an information signal having a corresponding 180° phase relationship, signal adding circuit means for combining the modulated square waves to provide a suppressed square wave carrier signal, and filter means to remove unwanted frequency components therefrom to provide a suppressed carrier double sideband signal.

Other objects, features and attending advantages will become apparent from the following description when taken in conjunction with the following drawings, in which.

In practicing the invention the carrier frequency signal is converted to first and second square waves, both at carrier frequency and in 180° phase relationship with one another. These square waves are in turn coupled to amplitude modulating circuits where each is modulated by information signals which are provided with a corresponding 180° phase relationship. The two modulated square waves are then added in a summing circuit to produce a resultant modulated signal having a suppressed square wave carrier. This resultant modulated square wave is then passed through a low pass filter to remove higher order harmonics, with the fundamental carrier frequency signal remaining to provide a suppressed carrier double sideband signal. This technique allows the carrier and the information signals to be very close in frequency, with the only frequency restriction being that the carrier frequency be higher than the frequency of the modulating information signal. Because of the manner in which the modulated square waves are combined the third harmonic is the first higher order frequency component appearing above the carrier frequency, and this component may be readily removed by a low pass filter to provide linear modulation and excellent carrier rejection without the use of carefully matched active circuit elements.

Figure 1:
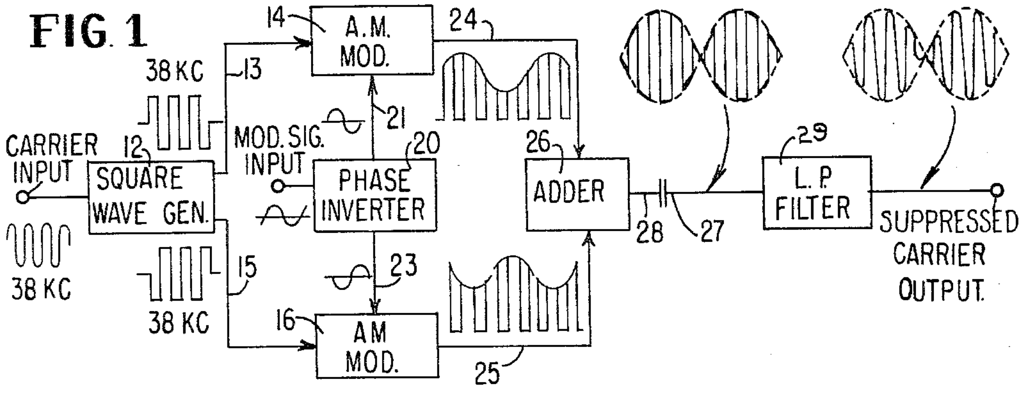
FIG. 1 is a block diagram of the system of the invention.

Referring now to FIG. 1, wherein the system of the present invention is shown in block form with corresponding waveforms, the carrier signal is coupled to the input of square wave generator 12. This circuit may consist of one of a number of known cross-coupled inverter stages to provide square waves which are at carrier frequency on leads 13 and 15. As shown by the illustrative waveforms, these square waves have a 180° phase relationship with one another. It is to be noted that the frequencies ascribed to the illustrative waveforms in FIG. 1 are merely representative and that other frequencies may be utilized with the system subject to the requirement that the carrier be of higher frequency than the modulating signal.

The square wave appearing on lead 13 is coupled to modulator 14 while the square wave appearing on lead 15 is coupled to modulator 16. Modulators 14 and 16 may be of any conventional type operable to provide amplitude modulation of the square wave signals supplied to them. To this end, a modulating signal is coupled to the input of phase inverter 20 and supplied on leads 21 and 23 to modulators 14 and 16 respectively. Although shown as a sine wave for purposes of illustration, this modulating signal may be of various types and in the particular instance of stereophonic multiplexing may be a typical audio signal. Phase inverter 20 provides a first signal which is in-phase with the modulating signal and a second signal which is 180° out-of-phase with the modulating signal. As shown in FIG. 1, the square wave supplied to the input of modulator 14 is in-phase with the carrier while the output of phase inverter 20 supplied to modulator 14 is in-phase with the modulating signal, and the corresponding square wave and output of phase inverter 20 supplied to modulator 16 are 180° out-of-phase with the carrier and the modulating signal, respectively.

The amplitude modulated square waves derived from the modulators 14 and 16 are coupled to adder circuit 26 on leads 24 and 25. These modulated square waves may have 100% modulation or may be provided with a fixed D.C. level with an A.C. modulation component superimposed thereon as shown, depending on the nature of modulators 14 and 16. Adder circuit 26 is conveniently a resistive adder so that the two signals coupled thereto from modulators 14 and 16 may be derived at a common point to appear on lead 28 as the sum of the two out-of-phase amplitude modulated square waves.

The output of adder 26 is coupled by capacitor 27 to low pass filter 29. Capacitor 27 removes any D.C. components from the sum signal produced by adder circuit 26 so that the signal applied to low pass filter 29 is a suppressed square wave carrier signal. Low pass filter 29 removes the higher order harmonics from the resultant square wave so that the fundamental frequency, which is identical to the frequency of the carrier input to square wave generator 12, remains. Since the modulating signal is of lower frequency than the carrier the envelope modulation is readily passed by filter 29. There is provided therefore at the output of low pass filter 29 a suppressed carrier double sideband signal from which the higher order harmonics introduced by the square wave have been removed.

Figure 2:
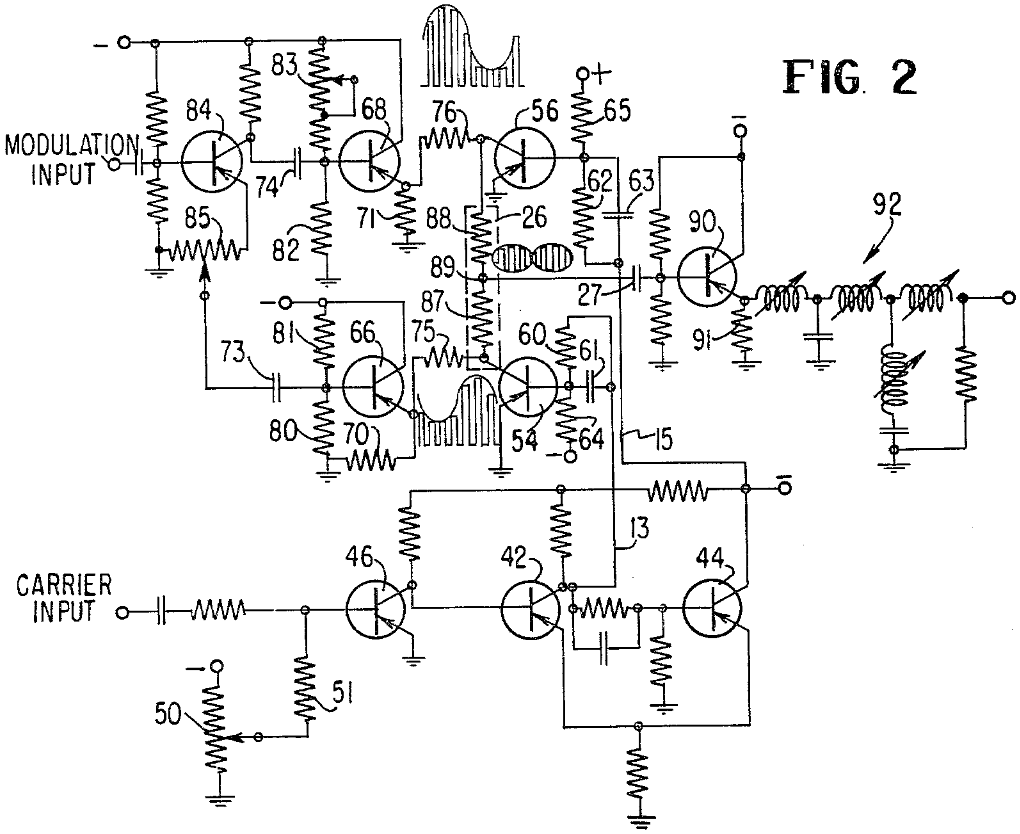
FIG. 2 is a schematic diagram of an embodiment of the invention.

Referring to the particularized circuit embodiment of FIG. 2, square wave generator 12 may take the form of a Schmitt trigger comprised of transistors 42 and 44. As should be apparent to those skilled in the art, there is provided at the output collector electrodes of these two transistors square wave signals at the frequency of the trigger applied to the input base electrode of transistor 42, which square waves are in 180° phase relationship with one another. To provide this triggering is first amplified by transistor 46, with the output collector electrode thereof connected to the input base electrode of transistor 42. A voltage divider arrangement including resistors 50 and 51 allows the bias of the transistor 46 to be adjusted to set the triggering level of the Schmitt trigger circuit.

Amplitude modulation of the out-of-phase square waves produced by transistors 42 and 44 of the Schmitt trigger circuit is achieved by gating transistors 54 and 56. To this end the output of transistor 42, appearing on lead 13, is coupled by a pulse shaping circuit including resistor 60 and capacitor 61 to the base electrode of transistor 54, while the output of transistor 44, appearing on lead 15, is coupled by a pulse shaping network including resistor 62 and capacitor 63 to the base electrode of transistor 56. The quiescent condition of transistors 54 and 56 is established by a voltage supplied through stabilizing resistors 64 and 65 to their base electrodes from a suitable supply, positive for the PNP devices shown. Accordingly, transistors 54 and 56 are gated on and off at a repetition rate corresponding to the frequency of the carrier signal triggering the Schmitt trigger circuit comprised of transistors 42 and 44.

Collector supply voltages for transistors 54 and 56, and hence the amplitude excursions of their gated outputs, are derived from transistors 66 and 68, respectively, connected in the emitter follower configuration. The collector electrode of each of these transistors are connected to a supply voltage (negative for the PNP devices shown) so that they draw collector-to-emitter current, thereby developing a fixed D.C. voltage across load resistors 70 and 71. A modulating or audio signal is coupled to the base electrodes of transistors 66 and 68 by capacitors 73 and 74 to cause a corresponding variation in the flow of collector-to-emitter current in each of these two transistors. As a result there is superimposed on the D.C. voltage appearing across resistors 70 and 71 an A.C. voltage representative of the modulating signal. When coupled by resistors 75 and 76 to the collector electrodes of transistors 54 and 56 there is provided a square wave at the collector electrodes of transistors 54 and 56 having an amplitude modulation corresponding to the modulating signal coupled to the base electrodes of transistors 66 and 68. It is to be noted that the modulation of these square waves includes a fixed D.C. component and a superimposed A.C. component. The magnitude of the D.C. component is established by the base biasing arrangement including resistors 80 and 81 for transistor 66 and resistors 82 and 83 for transistor 68. By making resistor 83 variable it is possible to adjust these D.C. components so that they are equal in magnitude.

The proper phase relationship between the two modulating signals applied to the base electrodes of transistors 66 and 68 are derived from phase inverter 84. By placing load resistors in both the collector and the emitter circuits in the well-known manner there is provided at the collector electrode of transistor 84 a signal in-phase with the modulating signal applied to its base electrode and provided across emitter resistor 85 a signal which is 180° out-of-phase therewith. Adjustment of emitter resistor 85 allows for balancing of the out-of-phase modulating signals so that they may be made of equal amplitude.

The signal adding or summing circuit shown generally at 26 includes equal valued resistors 87 and 88 connected between the collector electrodes of transistors 54 and 56, respectively, and a common junction point 89. There appears at junction point 89 a signal representing the sum of the two out-of-phase modulated square waves in the form of a suppressed square wave carrier signal. This suppressed carrier signal is coupled by capacitor 27, removing further D.C. components therefrom, to the input base electrode of transistor 90, also connected in the emitter follower configuration. The output of transistor 90, developed across emitter resistor 91 for impedance matching, is coupled to the input of the low pass filter shown generally at 92. This filter is of the conventional type pi configuration and is adapted to remove higher order harmonics from the suppressed wave carrier signal so that only the fundamental frequency component remains. Typically low pass filter 92 may be provided with sharp cut-off characteristics at some predetermined frequency slightly above the frequency of the carrier wave signal. This fundamental component is at the same frequency as the modulated carrier and accordingly there is provided at the output of filter network 92 suppressed carrier double sideband signal.

The manner in which the above described system produces a suppressed carrier double sideband signal can be best understood by considering the Fourier series of the various waveforms involved. Assuming the simplified case of sinusoidal modulation to produce waveforms of the type shown in FIG. 1, the amplitude modulated square wave appearing at the collector electrode of transistor 54 may be expressed by:

$$(1)\quad e_0=(E'_{DC}+K\left(\tfrac{1}{2}+\frac{2}{\pi}\sin wt+\frac{2}{3\pi}\sin 3wt+\cdots\right.$$

where K represents the amplitude of the modulating or audio signal applied to the square wave.

Because of the 180° phase reversal of both the carrier signal and the modulating signal, the corresponding wave-form appearing at the collector electrode of transistor 56 may be expressed by:

(2)

$$e_{180}=(E''_{DC}-K)\left(\tfrac{1}{2}-\frac{2}{\pi}\sin wt-\frac{2}{3\pi}\sin 3wt-\cdots\right.$$

The sum of these two signals derived at junction point 89 of adder circuit 26 is:

(3)

$$e_0+e_{180}=\frac{E'_{DC}+E''_{DC}}{2}+\frac{4K}{\pi}\sin wt+\frac{4K}{3\pi}\sin 3wt+$$

$$E'_{DC}-E''_{DC}\left(\frac{2}{\pi}\sin wt+\frac{2}{3}\pi\sin 3wt+\cdots\right.$$

When the outputs of cathode followers 66 and 68 are balanced by adjustment of resistors 83 and 85 so that $E'_{DC}=E''_{DC}$, this sum signal is simplified to:

(4) $$e_0+e_{180}=E_{DC}+\frac{4K}{\pi}\sin wt+\frac{4K}{3\pi}\sin 3wt+\cdots$$

When coupled through capacitor 27 to remove further D.C. components, the resultant suppressed square wave carrier signal may be expressed by:

(5) $$e_0+e_{180}=\frac{4K}{\pi}\sin wt+\frac{4K}{3\pi}\sin 3wt+\cdots$$

It can be seen that the above expression includes, in addition to the fundamental frequency of the carrier, third and higher order harmonics. When passed through low pass filter 92 the resultant signal becomes $K'$ sin *wt*, a sinusoidal signal of carrier frequency modulated by the in-phase modulating signal, in the form of a suppressed carrier signal.

The invention provides, therefore, a system for generating suppressed carrier double sideband signals exhibiting excellent carrier rejection and drift free, linear modulation. It has been found, for example, that with a modulating system of the foregoing type a 38 kc. carrier can be suppressed approximately 60 db below maximum audio signal level for short intervals, and will maintain approximately 46 db rejection below maximum audio over days of operation. The invention is particularly adapted for use in applications where the carrier signal and the modulating signal are in the same order of magnitude as is the case in stereophonic multiplexing, and the system may be transistorized throughout without the use of transformers or accurately balance active circuit elements.

I claim:

A system for generating suppressed carrier double sideband signals including in combination, a Schmitt trigger circuit having an input circuit adapted to receive a carrier wave and first and second output circuits providing square wave signals in phase inverted relationship in response to said carrier wave, said square wave signals having the same fundamental frequency as said carrier wave, first and second gating means each having a control electrode coupled by a resistance-capacitance network to said first and second output circuits respectively, means including a first resistance network coupling a signal having a component representative of a varying modulating signal to said first gating means, means including a second resistance network coupling a signal having a component representative of a signal having a phase inverted relationship to said varying modulating signal to said second gating means, said first and second gating means providing varying amplitude modulation of said first and second square wave signals with said resistance network coupling means preventing phase shifts in said varying modulating signal, a resistive adder coupled to said first and second gating means for summing said amplitude modulated square wave signals, low pass filter means for removing harmonics of said fundamental frequency from said sum signal, and means including capacitor means coupling alternating components of said sum signal to said filtering means.

References Cited by the Examiner

UNITED STATES PATENTS 3,027,522 3/1962 Boxall et al. ---------- 332—44

ROY LAKE, *Primary Examiner.*

ALFRED L. BRODY, *Examiner.*